(12) United States Patent
Ahlin

(10) Patent No.: US 7,954,863 B2
(45) Date of Patent: Jun. 7, 2011

(54) BUMPER BEAM FOR A VEHICLE

(75) Inventor: Hans Ahlin, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 122 days.

(21) Appl. No.: 12/309,986

(22) PCT Filed: Aug. 1, 2007

(86) PCT No.: PCT/SE2007/000705
§ 371 (c)(1),
(2), (4) Date: Feb. 5, 2009

(87) PCT Pub. No.: WO2008/020795
PCT Pub. Date: Feb. 21, 2008

(65) Prior Publication Data
US 2009/0206617 A1 Aug. 20, 2009

(30) Foreign Application Priority Data
Aug. 15, 2006 (SE) ...................................... 0601680

(51) Int. Cl.
B60D 1/56 (2006.01)

(52) U.S. Cl. ...................................................... 293/117

(58) Field of Classification Search ................... 293/102, 293/117; 280/495
See application file for complete search history.

(56) References Cited

U.S. PATENT DOCUMENTS 6,634,702 B1 * 10/2003 Pleschke et al. ......... 296/187.04
6,893,063 B2 * 5/2005 Harrison et al. ............... 293/117
7,137,658 B2 * 11/2006 Haneda et al. ................. 293/117

FOREIGN PATENT DOCUMENTS

| DE | 19902478 C1 | | 7/2000 |
| DE | 10110332 A1 | * | 9/2002 |
| DE | 10359483 A1 | | 7/2005 |
| EP | 1681208 A2 | | 7/2006 |
| FR | 2866830 A1 | * | 9/2005 |
| JP | 2001 171560 A | | 6/2001 |
| WO | WO 03080398 A1 | | 10/2003 |
| WO | WO 2005068263 A1 | * | 7/2005 |
| WO | WO 2005/087519 A1 | | 9/2005 |

* cited by examiner

Primary Examiner — H Gutman
(74) Attorney, Agent, or Firm — Mark P. Stone

(57) ABSTRACT

A bumper beam in the form of an open hat beam with a central flange (11) pointing outwards has a transverse bulkhead (23) at one of its fastening portions (17). An internally threaded socket (22) is welded to the transverse bulkhead parallel with the bulkhead and protrudes through a hole (21) in the central flange (11) so that a tow eyelet can be screwed firmly into the socket when needed and thereafter be unscrewed.

1 Claim, 3 Drawing Sheets

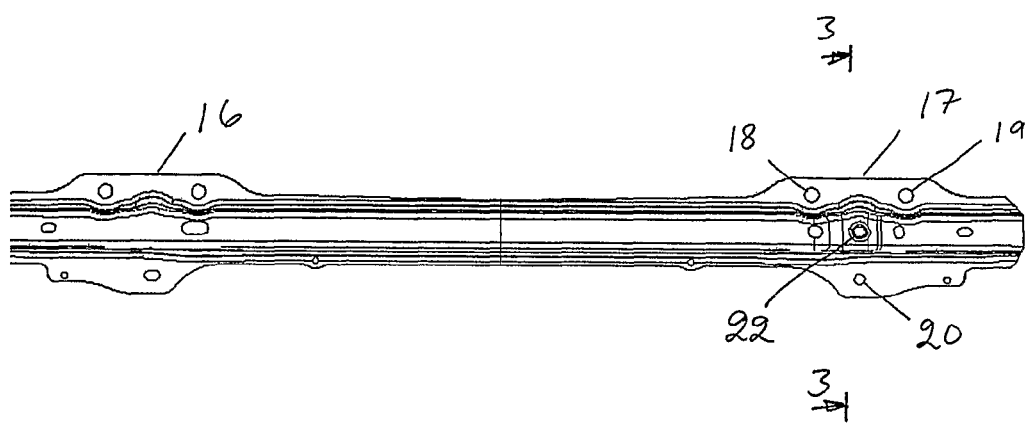
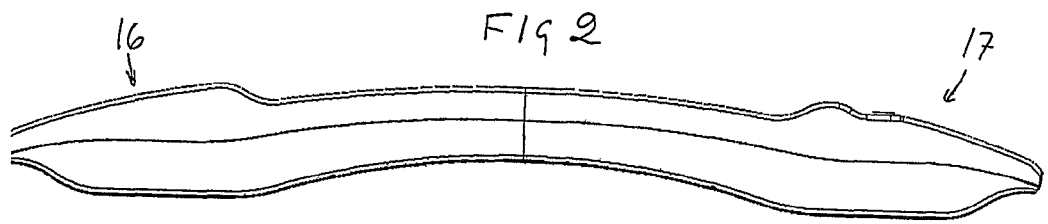

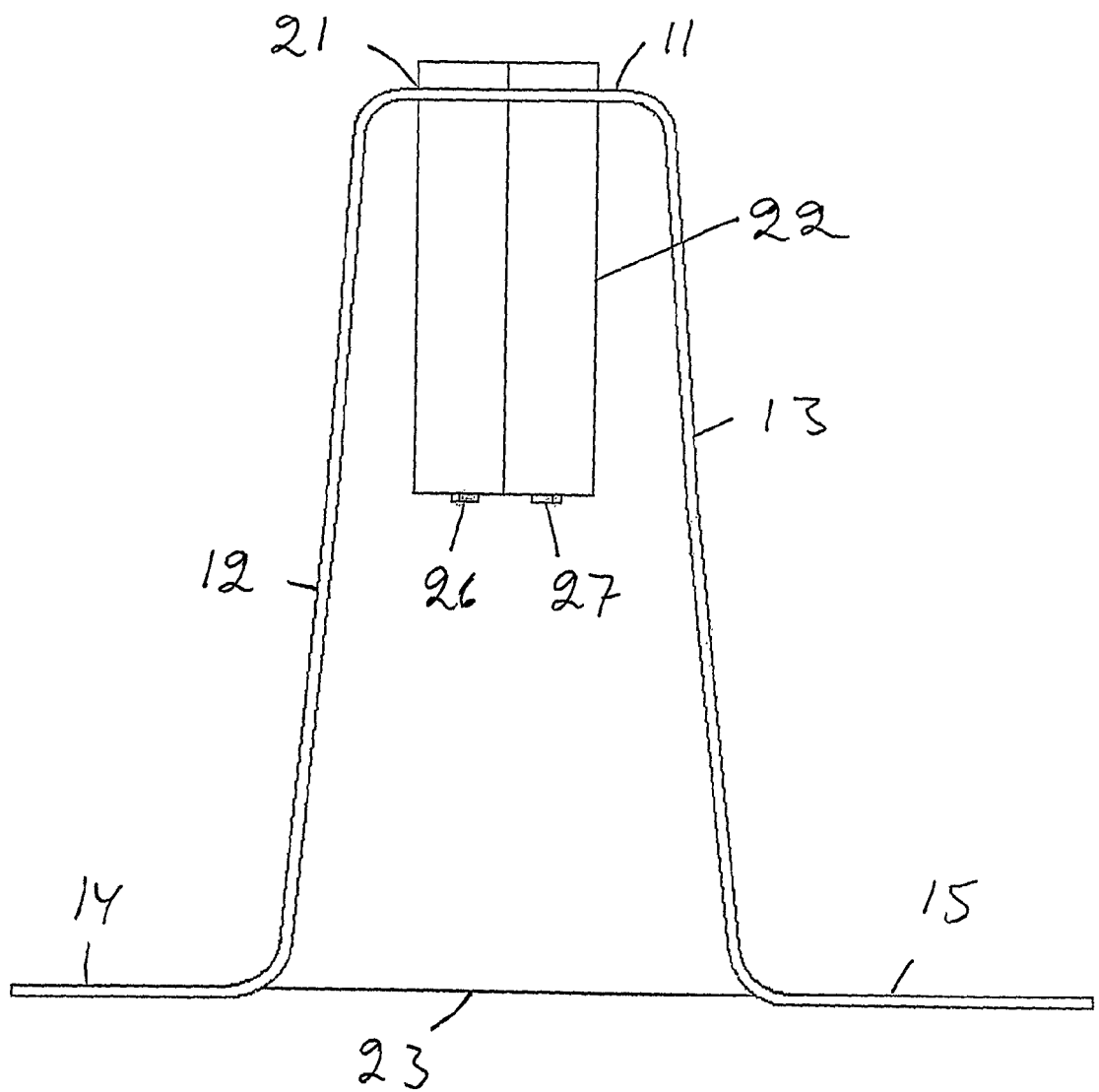

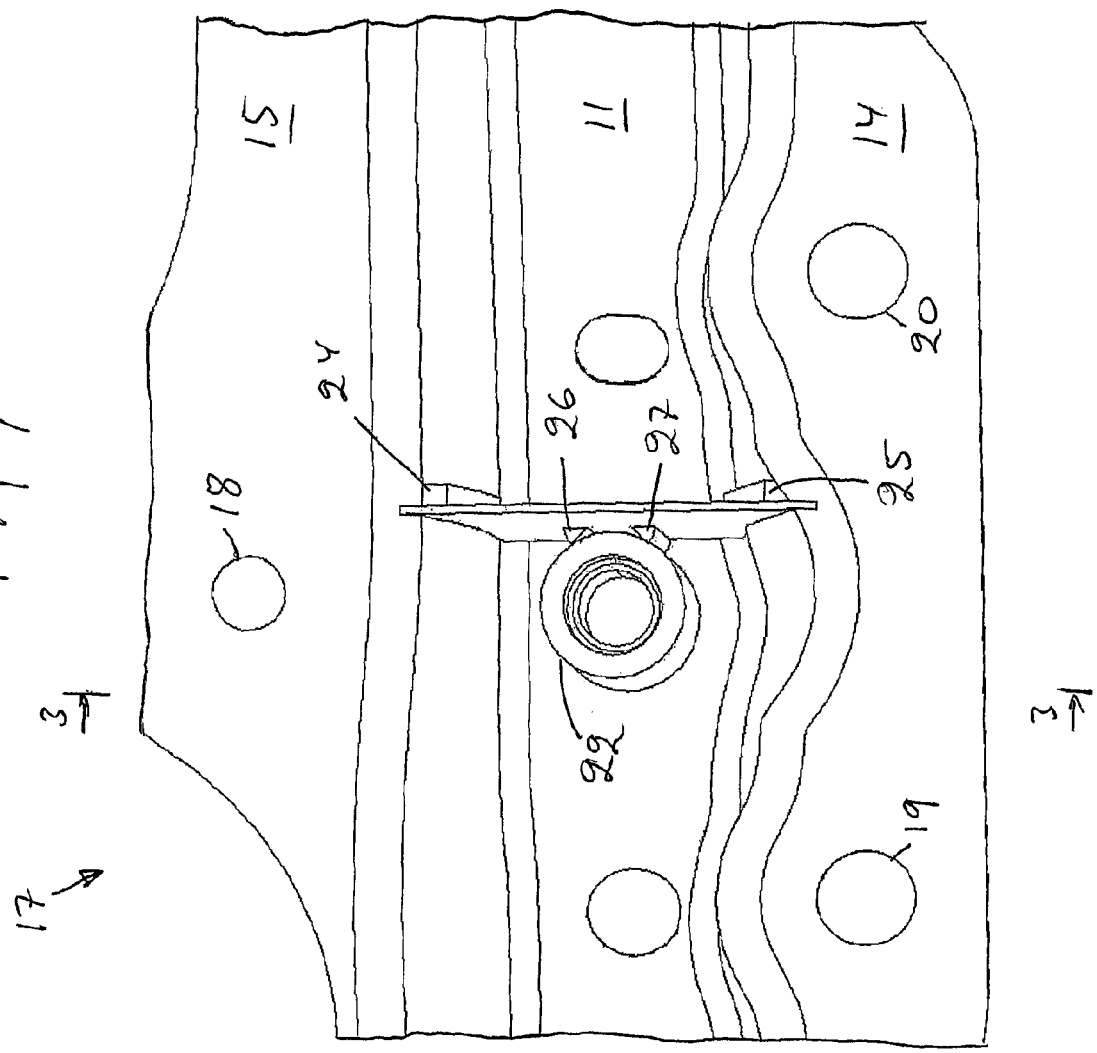

BUMPER BEAM FOR A VEHICLE

TECHNICAL FIELD

The invention relates to a bumper beam with a threaded fastening socket for a threaded tow eyelet.

OBJECT AND BRIEF DESCRIPTION OF THE INVENTION

The object of the invention is to provide at low cost a fastening for a tow eyelet which is stable and safe and does not weaken the bumper beam. This object is achieved when the bumper beam, at least in its fastening region, is of generally U-shaped cross-section with the crown pointing outwards and has a transverse bulkhead fastened there between the crown's sides, and the fastening socket is parallel with the bulkhead.

BRIEF DESCRIPTION OF THE DRAWINGS DEPICTING A PREFERRED EMBODIMENT EXAMPLE OF THE INVENTION

FIG. 1 is a front view of a bumper beam according to the invention.

FIG. 2 is a view from above of the bumper beam in FIG. 1.

FIG. 3 is a cross-section along the lines 3-3 in FIG. 1 and FIG. 4.

FIG. 4 is a view of the area indicated by the arrows 4-4 in FIG. 1.

DETAILED DESCRIPTION OF DEPICTED EMBODIMENT EXAMPLE

The drawings refer to a bumper beam for vehicles, e.g. passenger cars. It is made of high-strength sheet steel and has an open hat beam shape with a central flange 11, two webs 12, 13 and two side flanges 14, 15. The fastening portions 16, 17 of the side flanges 14, 15 have fastening holes 18, 19, 20 by means of which the beam can be bolted firmly to loadbearing elements of the vehicle, usually to end plates on the vehicle's side rails or to crash boxes between the bumper and the side rails so that the crown of the hat beam points outwards. The hat beam is of varying cross-section along its length. The webs 12, 13 are higher at the fastening portions than in the middle portion, as illustrated in FIG. 2.

In the fastening portion 17, the hat beam's central flange 11 has a hole 21 through which an internally threaded fastening socket 22 extends so that a tow eyelet can be screwed firmly into the socket when needed and thereafter unscrewed when not needed. The fastening socket is welded firmly in a bulkhead 23 by longitudinal welds 26, 27 along the socket. The bulkhead 23 is welded firmly in the hat beam by being welded to the two webs 12, 13 by welds 24, 25. These welds may extend along the whole of the webs but welds at the top and bottom may generally be sufficient. The socket 22 is welded firmly to the bulkhead 23 before the bulkhead is fitted and welded firmly in the hat beam. The bulkhead may be welded to the bottom of the beam, i.e. to the central flange.

The fastening portion 16 may also have a bulkhead as reinforcement even if it has no fastening socket for a tow eyelet.

The bumper beam need not have the shape of a hat beam but may be of some other shape with a generally U-shaped cross-section with the crown pointing outwards, at least at the fastening portion. It may have a sheet steel cover so as to be, at least partly, of closed cross-section despite the embodiment example depicted with a totally open cross-section. The invention may be applied to both the rear bumper of a vehicle and the forward bumper.

The invention claimed is:

1. A bumper beam with a threaded fastening socket (22) for a threaded tow eyelet, characterised in that the bumper beam, at least in a fastening region (17) thereof, is of generally U-shaped cross-section with a crown (11-13) pointing outwards and has a transverse bulkhead (23) fastened between sides (12, 13) of said crown, and the fastening socket (22) is parallel with the transverse bulkhead and welded to the transverse bulkhead.

* * * * *